United States Patent [19]

Melzi et al.

[11] Patent Number: 4,513,865

[45] Date of Patent: Apr. 30, 1985

[54] DISPOSABLE OIL DRAIN PAN AND CONTAINER COMBINATION

[76] Inventors: Edward R. Melzi, 3310 Ivanhoe La., Garland, Tex. 75042; Arie Sharon, 1014 Wake Dr., Richardson, Tex. 75081

[21] Appl. No.: 496,593

[22] Filed: May 20, 1983

[51] Int. Cl.³ .............. B65D 21/02; B65D 25/40; B65D 81/36; F16N 31/00
[52] U.S. Cl. .............. 206/508; 206/509; 215/10; 220/1 C; 220/288
[58] Field of Search .............. 220/1 C, 458, 288; 215/10; 206/508, 509

[56] References Cited

U.S. PATENT DOCUMENTS

| | | | |
|---|---|---|---|
| 673,241 | 4/1901 | Campbell | 220/1 C |
| 1,506,028 | 8/1924 | Perritt | 220/1 C |
| 3,071,281 | 1/1963 | Sawai | 220/258 |
| 3,323,668 | 6/1967 | Hills | 215/10 |
| 3,401,819 | 9/1968 | Salamone | 220/258 |
| 3,410,438 | 11/1968 | Bartz | |
| 4,010,863 | 3/1977 | Ebel | 220/1 C |
| 4,153,155 | 5/1979 | Benno | 220/1 C |
| 4,301,841 | 11/1981 | Sandow | |
| 4,308,955 | 1/1982 | Schieser | 215/10 |
| 4,403,692 | 9/1983 | Pollacco | 220/1 C |

FOREIGN PATENT DOCUMENTS 2351932 10/1973 Fed. Rep. of Germany.

Primary Examiner—George E. Lowrance
Attorney, Agent, or Firm—Glaser, Griggs & Schwartz

[57] ABSTRACT

A disposable oil drain pan and container combination features a large sidewall opening which is sealed by a removable screw cap. The oil pan and container combination is intended for use as (a) a container for new motor oil for purchase at a retail establishment, and (b) a disposable drain pan receptacle for use in changing oil in an automobile. The capacity of the container is preferably five quarts so that its contents can be emptied directly into the crankcase of an automobile during an oil change. After the contents have been emptied into the crankcase, the container assembly is set aside until time for the next oil change. At that time, the large screw cap is removed from the side of the container and the container is laid flat beneath the crank case so that the used oil can drain directly into the container through the sidewall opening. After the draining procedure has been completed, the cap is screwed on securely so that the filled container can be discarded.

1 Claim, 12 Drawing Figures

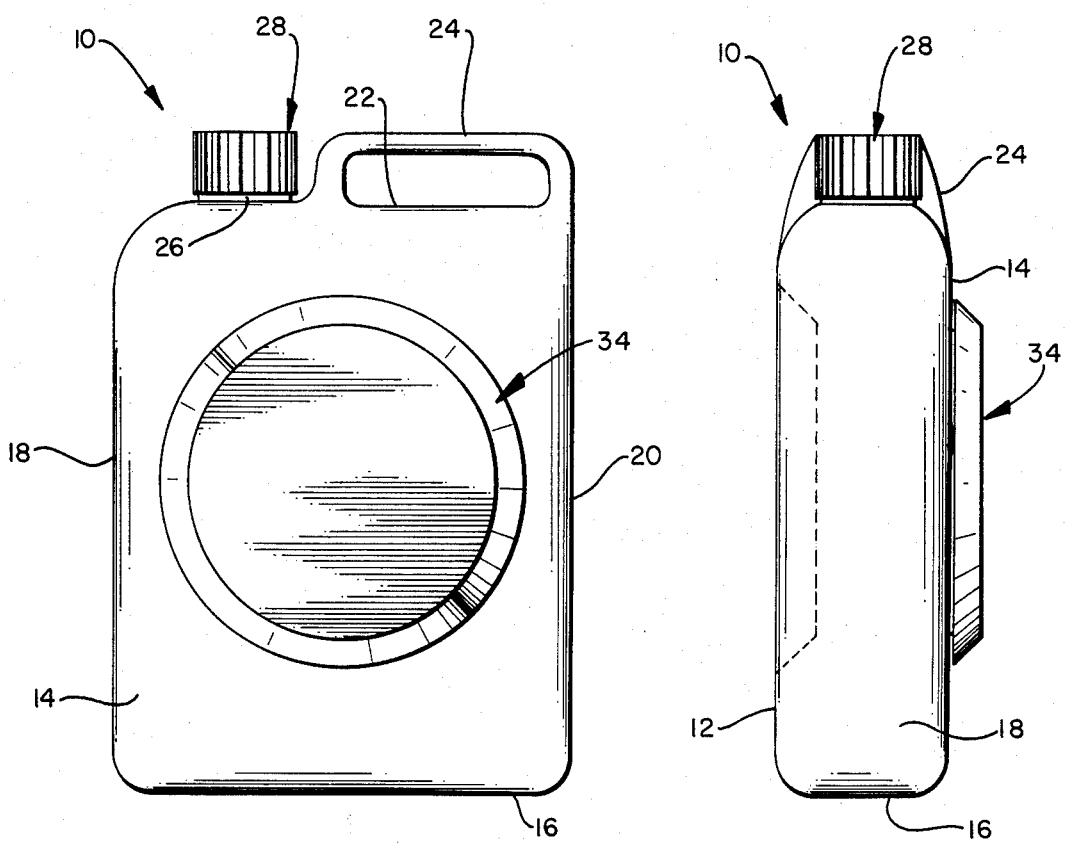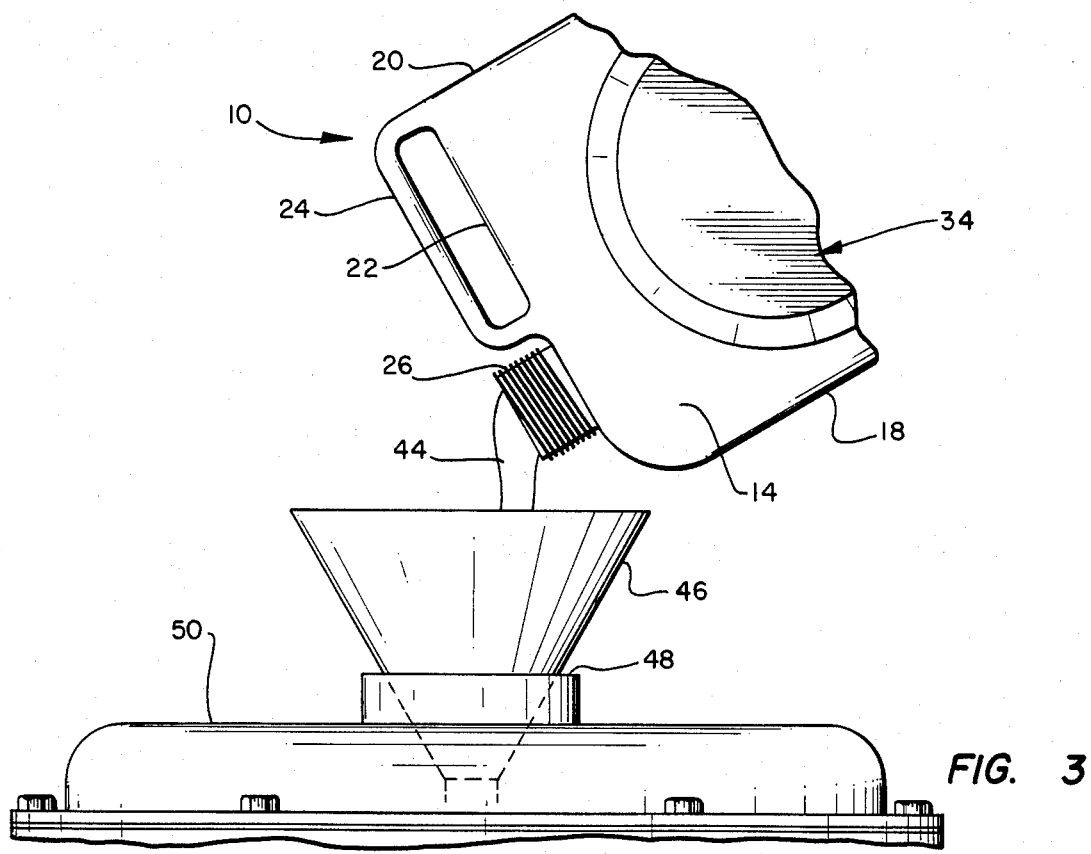

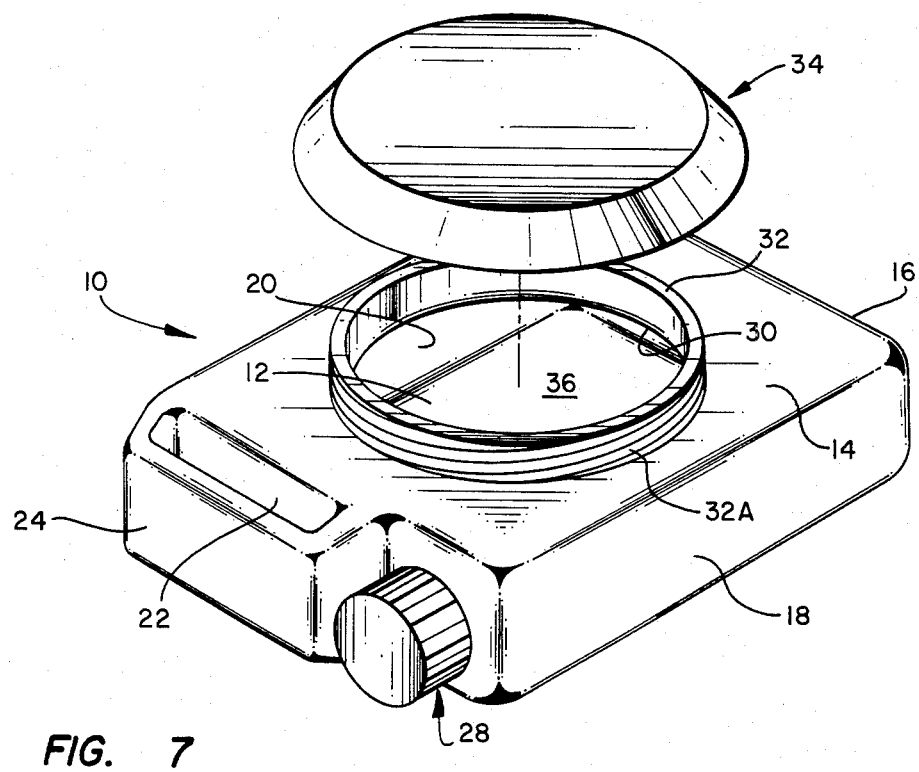
FIG. 7
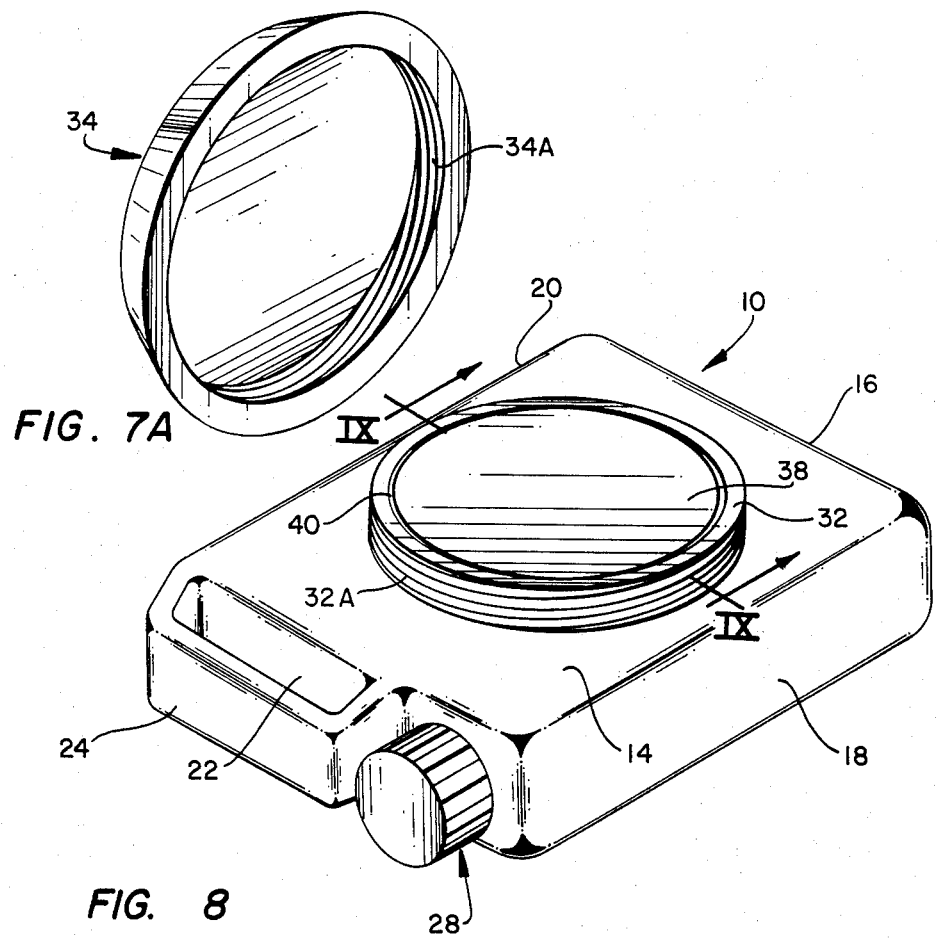
FIG. 7A
FIG. 8

DISPOSABLE OIL DRAIN PAN AND CONTAINER COMBINATION

BACKGROUND OF THE INVENTION

1. Field of the Invention:

This invention relates to multi-purpose containers for storing and disposing of new and spent liquids such as motor oil and the like.

2. Description of the Prior Art

According to conventional practice, oil is drained from the sump of an automobile crankcase by removing a drain plug and allowing the oil to discharge by gravity flow into a drain pan. This procedure is best carried out with the automobile supported overhead on a hydraulic lift, with the oil draining into a large drum. However, most persons who change the oil personally do not have access to an overhead lift, and carry out the oil change procedure by placing an open drain pan beneath the drain plug opening. Other fluids such as anti-freeze and transmission oil may also be changed as a do-it-yourself service item in the same manner. The collection and disposal of these spent fluids has long represented a problem. Commercially available oil change drain pans are too expensive to be used on a one-time disposable basis, and the practice of dumping the used oil into a sewer or onto the ground is harmful to the environment.

OBJECTS OF THE INVENTION

It is, therefore, the principal object of the present invention to provide an inexpensive, disposable container which can initially store and transport new motor oil or the like and which can be used as an oil change drain receptacle.

A related object of the invention is to provide a disposable oil drain pan and container combination having external structural features which permit two or more of such containers to be stacked or placed side-by-side in nesting engagement with each other.

SUMMARY OF THE INVENTION

A disposable oil drain pan and container combination features a large sidewall opening which is sealed by a removable screw cap. The disposable oil pan and container combination is intended for use as a container for new crankcase oil for purchase at a retail establishment, and as a drain pan receptacle for use in changing oil in an automobile. The capacity of the container is preferably five quarts so that its contents can be emptied directly into the crankcase of an automobile during an oil change. After the contents have been emptied into the crankcase, the container assembly is set aside until time for the next oil change. At that time, the large screw cap is removed from the side of the container and the container is laid flat beneath the crank case so that the used oil can drain directly into the container through the sidewall opening. After the draining procedure has been completed, the cap is screwed on securely so that the filled container can be discarded.

The multiple purpose receptacle of the invention is a container for storing new or spent fluid such as motor oil having four generally rectangular-shaped sides with a top and bottom. The bottom and at least one major side of the container are flat so that the container can rest in an upright, stable position on its bottom panel or in a stable position on the flat major side panel. A large circular drainage opening is formed in one major side panel, and is sealed by a removable screw cap. According to a preferred embodiment, the circular drainage opening is bounded by a radially projecting, threaded shoulder. The removable cap is screwed onto and off of the threaded shoulder to seal the container and to provide drainage access into the container, respectively.

According to another embodiment, a durable membrane seal is secured across the circular opening and is compressed between the threads and grooves of the screw cap and shoulder.

According to another embodiment, the drainage opening is sealed by a sidewall panel member which is integrally formed with the threaded shoulder. In this embodiment, the panel member is externally scored by a circular groove. According to this arrangement, new motor oil can be stored or transported in the container without risk of leakage. After the new oil has been emptied into the crankcase, the circular seal panel can be punched out and removed to provide access through the circular opening, so that the container may be used as an oil change drainage receptacle.

The novel features which characterize the invention are defined by the appended claims. The foregoing and other objects, advantages and features of the invention will hereinafter appear, and for purposes of illustration of the invention, but not of limitation, an exemplary embodiment of the invention is shown in the appended drawings.

BRIEF DESCRIPTION OF THE DRAWINGS

FIG. 1 is a front elevation view of the container of the present invention;

FIG. 2 is a left side elevation view of the container shown in FIG. 1;

FIG. 3 is an elevation view in which the multiple purpose container is shown as it is used for pouring new motor oil into the crankcase of an engine;

FIG. 7 is a perspective view of the combination container lying on one major side in its stable, oil change position;

FIG. 7A is a perspective view which illustrates the underside of the large diameter closure cap;

FIG. 8 is a view similar to FIG. 7 which illustrates an alternate embodiment of the invention;

DESCRIPTION OF THE PREFERRED EMBODIMENTS

Figure 4:
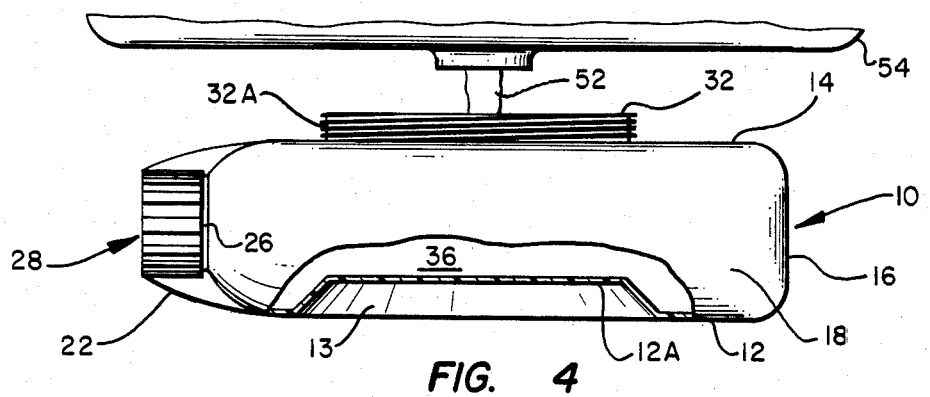
FIG. 4 is an elevation view of the multiple purpose container as a drainage receptacle for receiving used oil from the sump of an engine.
Figure 5:
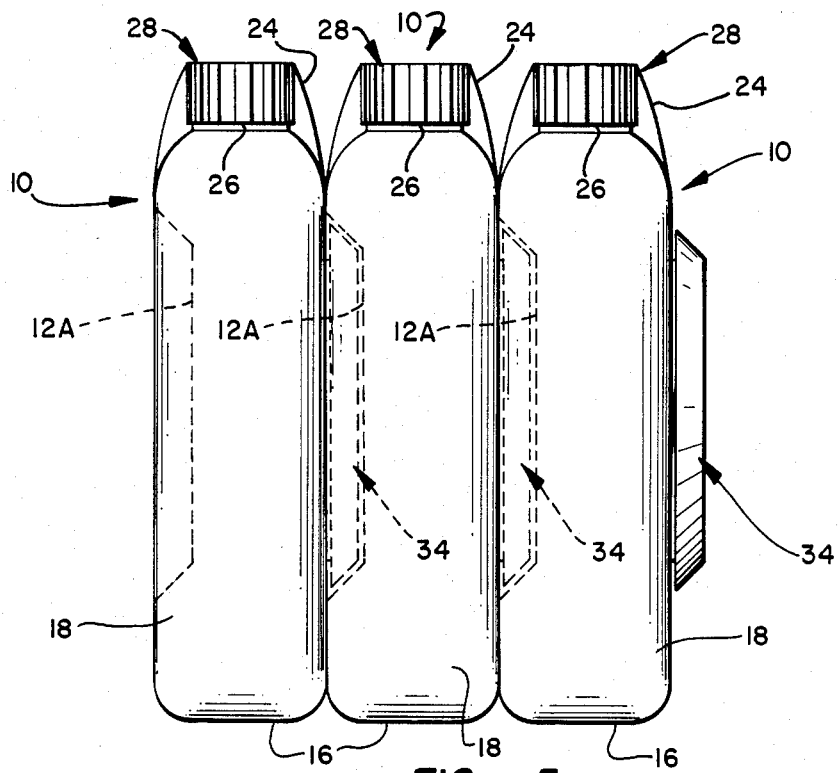
FIG. 5 is a side elevation view which illustrates horizontal stacking of the multiple purpose containers.

In the description which follows, like parts are marked throughout the specification and drawings with the same reference numerals, respectively. The drawings are not necessarily to scale and in some instances proportions have been exaggerated in order to more clearly depict certain features of the invention.

Referring now to FIGS. 1 and 2, the multiple purpose container/receptacle assembly 10 includes a container body formed by a rear sidewall 12, a front sidewall 14, a bottom panel 16, left and right side panels 18,20 and a top panel 22.

A handle member 24 is formed on one side of the top panel 22, and a pour spout 26 is formed on the opposite side of the top panel 22. The pour spout 26 is sealed by a removable closure cap 28.

Figure 6:
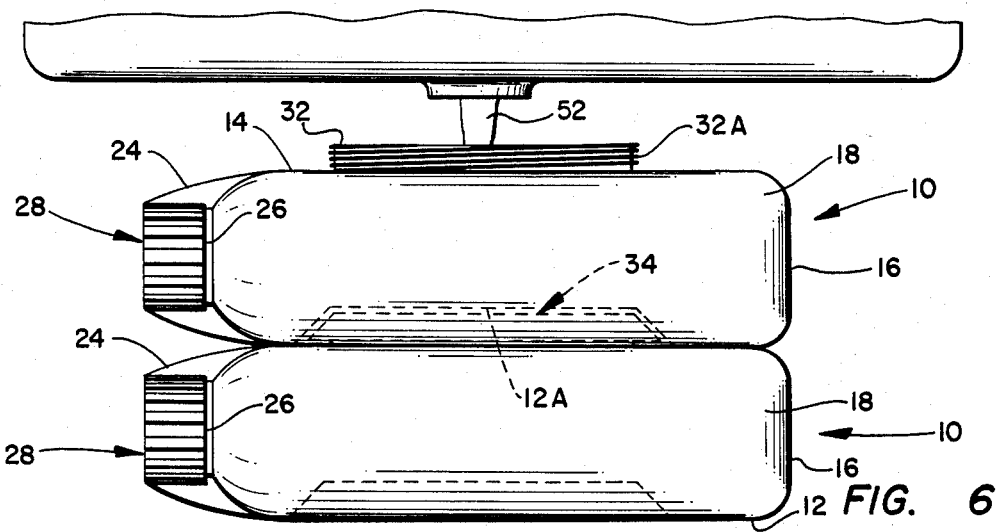
FIG. 6 is an elevation view which illustrates vertical stacking of two multiple purpose containers, with the uppermost container being utilized as an oil change drainage receptacle.

Referring now to FIG. 7, a large diameter, circular drainage access opening 30 is formed in the front sidewall panel 14. The circular drainage opening 30 is bordered by a shoulder 32 having threads and grooves 32A. A large diameter, circular cap 34 is provided with threads and grooves 34A for engaging the threads and grooves of the shoulder 32, thereby providing a fluid seal across the drainage opening 30 when the container 10 is used as a receptacle for containing or transporting a liquid such as new motor oil. When the cap 34 is removed as shown in FIGS. 4 and 6, the container 10 can be turned onto its rear sidewall panel 12 in the horizontal position where it can serve as a drainage receptacle. Also, in this position, it can serve as a liquid reservoir in which small tools or machine parts can be placed in a solvent solution for cleaning. The sidewall access opening 30 is preferably large enough to receive a standard size oil filter, and to permit small tools or machine parts to be inserted into and withdrawn from the reservoir 36 by hand.

The body of the container 10, the closure cap 28 and large diameter closure cap 34 are preferably formed of an inexpensive but durable polymer material which is non-reactive to petroleum products, and which can be worked by conventional injection molding techniques to provide the desired form and dimensions.

Figure 9:
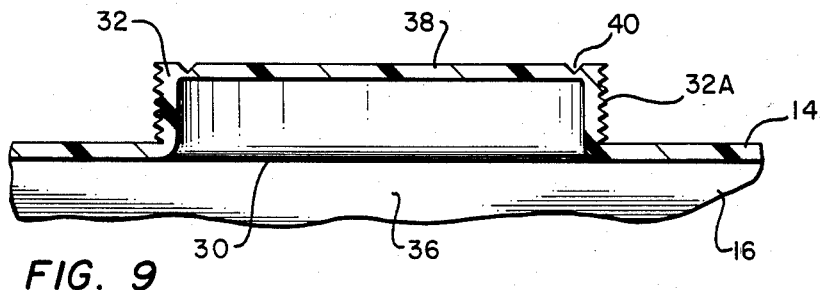
FIG. 9 is a sectional view taken through the lines IX—IX of FIG. 8.

Referring now to FIGS. 8 and 9, the seal provided by the closure cap 34 is enhanced by an integrally formed circular knock-out panel 38. The knock-out panel 38 is integrally formed with the threaded shoulder 32 which borders the circular drainage access opening 30. The surface of the knock-out panel 38 is scored by a circular groove 40 which ensures that the knock-out panel 38 will break-away cleanly by the application of an external force when it is desired to use the container as an oil change drain receptacle.

Figure 10:
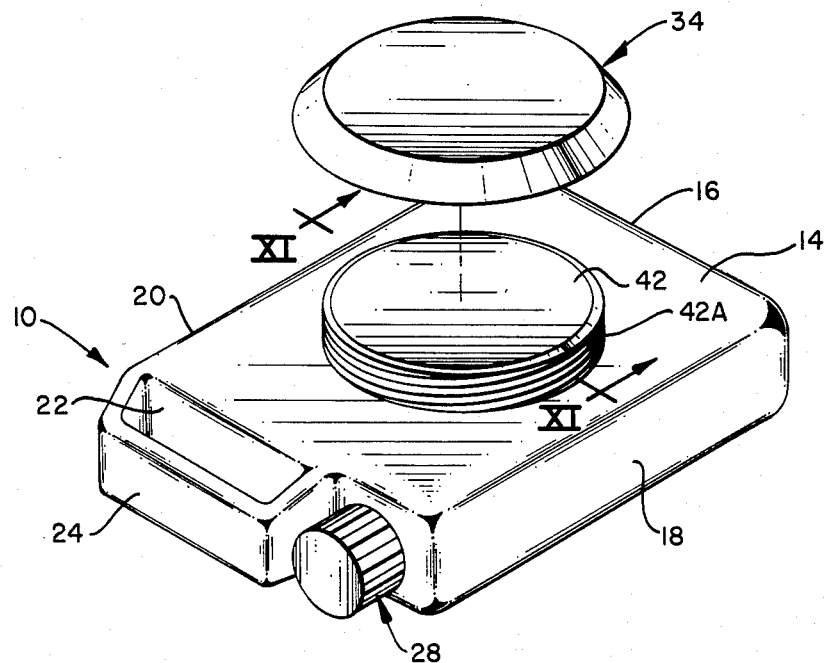
FIG. 10 is a view similar to FIG. 8 which illustrates yet another embodiment of the invention; and, FIG. 11 is a sectional view taken along lines XI—XI of FIG. 10.
Figure 11:
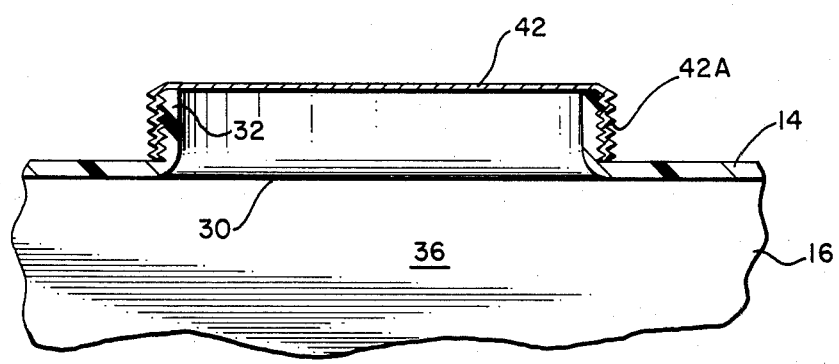

An alternative sealing arrangement is illustrated in FIGS. 10 and 11. In this arrangement, the drainage opening 30 and the threaded shoulder 32 are sealed by a durable membrane 42. The membrane 42 is formed of a durable material such as heavy guage aluminum foil or a polymer sheet material. The fluid seal is enhanced by the membrane as it is compressed between the threads and grooves of the shoulder 32 and closure cap 34.

The dimensions of the container assembly 10 should be large enough so that the reservoir 36 will hold a volume at least equal to the amount to be changed, e.g. five quarts or more for motor oil. If desired, the volume of the reservoir can be greater than five quarts to accommodate the oil filter element as well as the used oil.

In the preferred embodiment illustrated in FIG. 7, the threaded shoulder 32 projects outwardly from the major sidewall panel 14 of the container assembly. The threaded shoulder 32 and closure cap 34 form an external projection which enlarges the lateral width of the assembly when the container assembly is standing in its upright stable position as shown in FIGS. 1 and 2. Because of limited availability of shelf space in retail establishments, it is desired to stack the container assemblies 10 as closely together as possible. Additionally, it is sometimes desirable to form a vertical stack of two or more of the container assemblies 10 when the uppermost container assembly is being used as an oil change drain receptacle, as shown in FIG. 6.

Accordingly, the rear major sidewall 12 is recessed along panel portion 12A (FIG. 4), thereby defining a recess or cavity 13. Panel 12A is recessed inwardly toward the access opening 30 and generally conforms in depth and profile with the large diameter closure cap 34. According to this arrangement, the large diameter closure cap 34 is received in nesting engagement within the recess 13 (FIG. 4) defined by the recessed panel portion 12A, thereby minimizing the stacked dimension of two or more of the container assemblies.

Another advantage of this arrangement is that the closure cap 34 serves an an index member which maintains the alignment of the stack. Additionally, when a vertical stack is formed, the nesting engagement of the large diameter closure cap 34 within the recess 13 formed by the panel member 12A serves as a stop member which prevents displacement of the upper container assembly with respect to the lower container assembly as shown in FIG. 6.

Referring to FIG. 6, the lowermost container assembly 10 is preferably filled with new motor oil, and the upper container assembly 10 is empty. It will be appreciated that the empty container 10 will be very light and easily moved out of position beneath the drainage opening, whereas the lowermost container, being filled with oil, will serve as an anchor. Because of the nesting engagement of the large diameter closure cap 34 within the recess defined by the panel member 12A, the uppermost container assembly 10 will remain centered on the lower container assembly 10, and will rotate slightly about the large diameter closure cap 34 instead of falling off or out of drainage alignment if it is inadvertently pushed.

Referring now to FIG. 3, a container assembly 10 is shown pouring new oil 44 through a funnel 46 into the crankcase opening 48 of an engine 50. In this configuration, the large diameter closure cap 34 is tightly secured onto the threaded shoulder 32 of the sidewall panel 14. When the new oil has been completely drained from the container assembly 10, the closure cap 28 is tightly secured in sealing engagement with the threaded pour spout 26. The empty container assembly 10 is then ready to be used as a drainage receptacle during the next oil change.

Referring to FIG. 4, the container assembly 10 is being used as a drainage receptacle for receiving used motor oil 52. The used motor oil 52 is being drained from the sump of an autmobile crankcase 54 after the drain plug has been removed by allowing the used oil to discharge by gravity flow through the drainage access opening 30. For some oil change operations, it will be desirable to stack two or more of the container assemblies 10 in a vertical arrangement as illustrated in FIG. 6.

In the preferred embodiment, the drainage access opening 30 is sealed by the large diameter closure cap 34. However, in other embodiments, for examples as shown in FIGS. 9 and 10, the drainage access opening 30 is covered by an additional sealing element, for example the knock-out panel 38 as illustrated in FIG. 9 or the durable membrane 42 as illustrated in FIG. 10. The knock-out panel 38 is removed by pressing inwardly until the knock-out panel 38 is severed from the threaded shoulder 32 along the groove 40. If the access opening 30 is covered by the membrane 42, it is simply peeled away to expose the reservoir 36.

It will be appreciated that the container assembly of the invention provides secure storage for transportation or handling of liquids such as motor oil. Additionally, it will be appreciated that the large diameter removable closure cap makes the container assembly convertible into a disposable drainage receptacle for oil change purposes and the like. The entire assembly is formed of inexpensive polymer materials and can be manufactured on a mass production basis, thereby making it inexpensive and suitable for one-time disposable service.

Although the invention has been described with reference to certain specific embodiments, the foregoing description is not meant to be construed in a limiting sense. Various modifications of the disclosed embodiments as well as alternative embodiments of the invention will become apparent to persons skilled in the art upon reference to the drawings and description of the invention. It is therefore contemplated that the appended claims will cover any such modifications or embodiments that fall within the spirit and scope of the invention.

What is claimed is:

1. A container for collecting and storing a liquid such as motor oil and the like comprising a container body having a bottom panel and a top panel, said bottom and top panels being joined by sidewall panels thereby defining an interior reservoir, said top panel having a pour spout portion and a closure cap removably secured to said pour spout, and one of said sidewall panel members having a large diameter opening providing drainage access into said reservoir, and a large diameter closure cap removably secured to the sidewall portion of said sidewall panel member bounding said access opening, said large diameter closure cap projecting outwardly with respect to said sidewall panel member, said container wall having a sidewall panel member oppositely disposed with respect to the panel member in which the access opening is formed, said oppositely disposed panel member having a panel portion which is recessed inwardly toward said access opening, said recessed panel portion being generally conformed in depth and profile with said large diameter closure cap thereby defining a pocket whereby two or more of said container assemblies may be stacked together with the outwardly projecting closure cap of one container assembly being received in nesting engagement within the pocket defined by the recessed panel portion of another container assembly.

* * * * *